United States Patent
Endo et al.

(10) Patent No.: US 7,664,939 B2
(45) Date of Patent: Feb. 16, 2010

(54) METHOD AND APPARATUS FOR DETECTING FALSE OPERATION OF COMPUTER

(75) Inventors: Takashi Endo, Musashimurayama (JP); Toshio Okochi, Musashino (JP); Takashi Watanabe, Kokubunji (JP); Shunsuke Ota, Kokubunji (JP); Tatsuya Kameyama, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 316 days.

(21) Appl. No.: 11/734,361

(22) Filed: Apr. 12, 2007

(65) Prior Publication Data
US 2007/0255980 A1  Nov. 1, 2007

(30) Foreign Application Priority Data
Apr. 28, 2006 (JP) .............................. 2006-124659

(51) Int. Cl.
*G06F 11/30* (2006.01)
*G06F 12/14* (2006.01)
*G06F 7/38* (2006.01)
*G06F 9/00* (2006.01)

(52) U.S. Cl. .................. 712/220; 713/187; 713/176; 711/219; 711/220

(58) Field of Classification Search ................ 712/220; 711/219, 220; 713/187, 176
See application file for complete search history.

(56) References Cited

FOREIGN PATENT DOCUMENTS

| JP | 57-199056 | 12/1982 |
|----|-----------|---------|
| JP | 60-003045 | 1/1985 |
| JP | 06-324914 | 11/1994 |
| JP | 09-146789 | 6/1997 |
| JP | 9-319621 | 12/1997 |
| JP | 10-063541 | 3/1998 |
| JP | 10-003407 | 1/1999 |

OTHER PUBLICATIONS

Rotenberg et al., Trace Cache: a Low Latency Approach to High Bandwidth Instruction Fetching, 1996.*
Howard et al., The Effect of Program Optimization on Trace Cache Efficiency, 1999.*
Smart Card Handbook, Second Edition, W. Rankl, et al., pp. 412-421.
"On the Importance of Checking Cryptographic Protocols for Faults" by Dan Boneh, et al. 1998, pp. 37-51.
"A Differential Fault Attack Technique against SPN Structures, with Application to the AES and KHAZAD" by Gilles Piret, et al., pp. 77-88.

* cited by examiner

*Primary Examiner*—Niketa Patel
*Assistant Examiner*—Jesse R Moll
(74) *Attorney, Agent, or Firm*—Mattingly & Malur, P.C.

(57) ABSTRACT

A program to be executed by a computer is divided into a plurality of code blocks, and, a unique code block ID is allotted to each code block. At the moment when the execution of the program is started, the code block ID corresponding to the execution start address is written in a memory, and in the case when the control transits from the code block to other code block, by use of code block operation values obtained beforehand from these two code block IDs thereof, the code block ID in the memory is updated, and it is judged whether the updated code block ID in the memory and the code block ID allotted to the code block as the execution objective are identical or not so that a control flow error is detected.

20 Claims, 12 Drawing Sheets

METHOD AND APPARATUS FOR DETECTING FALSE OPERATION OF COMPUTER

CROSS-REFERENCE TO RELATED APPLICATION

The present application claims priority from Japanese Patent Application No. JP 2006-124659 filed on Apr. 28, 2006, the content of which is hereby incorporated by reference into this application.

TECHNICAL FIELD OF THE INVENTION

The present invention relates to a technique for detecting control flow error of a computer which executes a program.

BACKGROUND OF THE INVENTION

Security modules represented by IC cards have guaranteed security by difficulties of reverse engineering, and computational difficulties of cryptanalysis. As methods for making the reverse engineering difficult, use of nonstandard cell, arrangement of dummy circuit, scrambled arrangement of memory, scrambled arrangement of bus, cutoff of test pad from product chip, and the like are performed (refer to W. Rankl & W. Effing, Smart Card Handbook Second Edition, pp. 412-420, WILEY, 2000, ISBN 0-471-98875-8 (Non-patent Document 1)).

With regard to the difficulties of cryptanalysis, security is based upon that the computation amount necessary for cryptanalysis is so sufficiently large that impossible to decrypt within an acceptable time. With regard to the computational difficulties, security is based upon the bit length of a secret key, and as the key length becomes long, so the computation amount necessary for decryption becomes large. Along with the progress of semiconductor technologies, the computer power available increases, and the safe key bit length has been getting longer as time goes by.

As an attack that is uninfluenced by countermeasures by such reverse engineering and the computational difficulties, there exists Differential Fault Analysis. Differential Fault Analysis is a method where a computational fault is made to occur in a chip in some way, and by use of the difference between the correct computational result and the wrong computational result, the key information is presumed, and attacks have been developed to many cryptosystems. The feature of the attack is that the time necessary for attack is extremely short. For example, it is known that in the Differential Fault Analysis of RSA cryptography using CRT algorithm, irrespective of the key length, if only one computational fault is obtained, from the greatest common divisor of the difference between the correct value and the fault value and the modulo N of the public key, a secret prime number p can be obtained, and a secret key can be calculated from the result (for example, refer to D. Boneh, R. A. Demillo, and R. J. Lipton: On the Importance of Checking Cryptographic Protocols for Faults, EUROCRYPT '97, Vol. 1233 of Lecture Notes in Computer Science, pp. 37-51, Springer-Verlag, 1997 (Non-patent Document 2)).

It is reported by E. Biham et al. that in DES cryptosystem used widely as a secret key cryptosystem, if several to several tens of correct computational results and fault results are obtained, a secret key can be obtained (E. Biham, A. Shamir, "A New Cryptanalytic Attack on DES," http://www.jya.com/dfa.htm, 1996). In also AES encryption proposed as a successor cryptosystem of DES cryptosystem, a method where if fault computations are made to occur in one byte among the halfway of computation, a key can be obtained from two fault computational results is proposed by J. J. Quisquater et al. (for example, refer to G. Piret and J. J. Quisquater: A Differential Fault Attack Technique against SPN Structures, with Application to the AES and KHAZAD, CHES 2003, LNCS 2779, pp. 78-88, Springer-Verlag, 2003 (Non-patent Document 3)). These attacks are characterized by that the computational amount necessary for attack is fixed irrespective of the length of cryptographic key, or in proportion with only the bit length of cryptographic key and the computational amount is extremely small.

As Differential Fault Analysis countermeasures, there are proposed, according to cryptosystems, (1) a method where computation is made twice, and it is confirmed whether the two computational results are equal; (2) a method where recalculation is made by inverse computation; and (3) a method where integrity of computations is checked by use of degenerate representation of residue field and parity, and so on. However, in these countermeasures, it is necessary to carry out a process for checking the integrity of computational results, and if the checking process is not carried out, Differential Fault Analysis can be possible.

As technologies to detect a control flow error, there are known the following first to fifth methods.

The first method is a method where the address designated as a destination of jump instruction existing in a program is stored beforehand as jump destination address information, and at the moment when the jump instruction is executed, it is checked that the address set as a program counter after execution of the jump instruction is included in the stored jump destination address information, and thereby the transition of an incorrect control flow is detected (for example, refer to Japanese Patent Application Laid-Open Publication No. 10-63541 (Patent Document 1) and Japanese Patent Application Laid-Open Publication No. 9-146789 (Patent Document 2)).

The second method is a method where a memory area storing a program and a memory area not storing a program are stored as flag information, or the valid range of address of a program counter is limited, and the case when the program counter indicates the memory area not storing a program is detected to judge it as a fault (for example, refer to Japanese Patent Application Laid-Open Publication No. 10-003407 (Patent Document 3)).

The third method is a method where each program area is numbered, and it is checked whether a value transits as determined sequence (for example, refer to Japanese Patent Application Laid-Open Publication No. 6-324914 (Patent Document 4)).

The fourth method is a method where a program is divided into modules beforehand, each module is numbered with a unique number, and at execution, numbers are updated along execution, and it is checked whether the unique numbers in module become identical to the expected values obtained in the case when modules are executed in the supposed sequence (for example, refer to Japanese Patent Application Laid-Open Publication No. 60-3045 (Patent Document 5) and Japanese Patent Application Laid-Open Publication No. 57-199056 (Patent Document 6)).

It is a method where it is checked whether the numbers are identical, and if they are not identical, it is judged as a fault (for example, refer to Japanese Patent Application Laid-Open Publication No. 9-319621 (Patent Document 7)).

SUMMARY OF THE INVENTION

In the first method of checking of the jump destination of the jump instruction, in the case where an error occurs in other portion than that of the jump instruction, and the value of the program counter itself changes, detection cannot be made. Further, in the second method, it is checked whether the program counter is in the determined address range, it is difficult to check when an abnormal transition of a control flow occurs in the address area where a regular program exists. In the third method, a program is divided into modules to number them with unique numbers respectively, and at a transition between modules by the jump instruction or the like, the unique numbers of the modules are stored to check the integrity of combination of module numbers before and after the transition. In the fourth method, the counter is updated at every transition of module. In the third and fourth methods, it is impossible to handle such a complicated flow control including, the case where the process sequence is fixed, an interflow of process flows such as a transition from different plural processes into one process, and a recursive calling.

An object of the present invention is to provide a technique for precisely carrying out a checking whether a program has been transited in the correct sequence or not.

Further, another object of the present invention is to provide a computer for precisely carrying out a checking whether a program has been transited in the correct sequence or not.

Furthermore, still another object of the present invention is to provide a compiler for generating object codes of a program to be executed in a computer for precisely carrying out a checking whether a program has been transited in the correct sequence or not.

The above and other objects and novel characteristics of the present invention will be apparent from the description of this specification and the accompanying drawings.

The typical ones of the inventions disclosed in this application will be briefly described as follows.

[1] In a method for detecting control flow error in a computer that executes a program, the program is divided into plural code blocks, and, each code block is allotted with a unique code block ID, and at the moment when the execution of the program is started, the code block ID corresponding to an execution start address is written in a memory, and in the case where the control transits from the code block to other code block, by use of code block operation values obtained beforehand from these two code block IDs, the code block ID in the memory is updated, and it is judged whether the updated code block ID in the memory, and the code block ID allotted to the code block as the execution objective are identical or not, so that a control flow error is detected.

According to the above-described means, the code block ID value of the code block now under execution is stored in the memory for code block ID, and at every transition between code blocks of execution control, by use of the differential value between the code block ID at the transition destination and the code block ID at the transition source, the ID value stored in the memory for code block ID is updated. Therefore, if the transition is not made in the correct sequence, the value stored in the memory for code block ID is not identical with the expected value of the code block ID of the code block being executed in practice. Accordingly, when the code block ID stored in the memory for code block ID is detected, an error is detected by a comparator. At the moment of updating of the code block ID value stored in the memory for code block ID, the code block ID of the code block at the transition destination is not substituted, but updating is made by use of the differential value between the code block at the transition source and that at the transition destination, therefore, if the differential value or the ID value stored in the memory for code block ID is erroneous, it does not become identical with the code block ID of the code block at the transition destination. Once the value of the code block ID stored into the memory for code block ID becomes a false value, it does not become a correct value in later updating process of the code block ID either, therefore, even in the case when the process to check the value of the code block ID overlooks an error for some reason, for example, due to external disturbance, the error is detected in the inspection of the code block ID to be carried out later. This achieves the provision of a technique for precisely carrying out an inspection on whether the program has been transited in the correct sequence or not.

[2] In the above [1], the head of the subroutine in the above program and the portion where the subroutine returns to the calling source belong to respectively different code blocks, and, in the case when there are plural return instructions to return to the calling source in a same subroutine, the plural return instructions are included in the same code block.

[3] In the above [2], before the execution of the instruction for subroutine call, by use of the differential value calculated beforehand, the code block ID value of the memory is updated so as to become identical with the code block ID of the head of the subroutine, and after the execution of the call instruction, by use of the differential value between the code block ID value where the return instruction of the subroutine exists and the code block ID after the subroutine call, the code block ID value stored in the memory can be updated.

[4] In the above [1], in the block ID updating process, the code block operation value is obtained by subtracting the expected value of the code block ID at the destination to which the control flow shifts, from the expected value of the code block ID of the code block where the instruction for shifting the control flow exists, and by subtracting the code block operation value from the code block ID value in the memory, the value of the code block ID can be updated.

[5] In the above [1], in the block ID updating process, the above code block operation value is the product of the expected value of the code block ID at the destination to which the control flow shifts, and the inverse in modulo a prime number P of the code block ID of the code block where the instruction for shifting the control flow exists, which is the modular multiplication in modulo a prime number P, and calculates the product of modular multiplication in modulo a prime number P of the value stored in the memory for code block ID and the differential value, so that the value of the code block ID can be updated.

[6] In a computer that executes a program that is divided into plural code blocks, and, a unique code block ID is allotted to each code block, arranged are: a memory capable of writing the code block ID corresponding to the execution start address at the moment when the execution of the program is started; in the case when the control transits from the code block to other code block; a computing unit capable of updating the code block ID in the memory by use of code block operation values obtained beforehand from these two code block IDs thereof; and a comparator capable of judging whether the updated code block ID in the memory and the code block ID allotted to the code block as the execution objective are identical or not so that a control flow error can be detected.

According to the above-described configuration, the memory can write the code block ID corresponding to the execution start address at the moment when the execution of the program is started, and the computing unit can update the code block ID in the memory, in the case when the control transits from the code block to other code block, by use of code block operation values obtained beforehand from these two code block IDs thereof. The comparator judges whether the updated code block ID in the memory and the code block ID allotted to the code block as the execution objective are identical or not. Therefore, a control flow error can be detected. This achieves the provision of a computer for precisely carrying out an inspection on whether the program has been transited in the correct sequence or not.

[7] Further, in a computer that executes a program that is divided into plural code blocks, and, a unique code block ID is allotted to each code block, arranged are: a memory capable of writing the code block ID corresponding to the execution start address at the moment when the execution of the program is started; and in the case when the control transits from the code block to other code block, a computing unit capable of updating the code block ID in the memory by use of code block operation values obtained beforehand from these two code block IDs thereof. In this case, a function for judging whether the updated code block ID in the memory and the code block ID allotted to the code block as the execution objective are identical or not, therefore, a function of detecting a control flow error may be added to the computing unit.

[8] In the above [7], the memory and the computing unit may be arranged in a CPU.

[9] In the above [6] or [7], a CPU for interpreting an instruction and executing the same may be arranged, and the CPU may have: a first function for, at occurrence of an interrupt, storing the value of a program counter and the code block ID value stored in the memory for code block ID in an address indicated by a stack pointer, and changing the value of the stack pointer for only the area used for storing the program counter value and the code block value; a second function for, in the case to recover from the interrupt process, taking out the code block ID value and the program counter value from the address indicated by the stack pointer, and storing the code block ID value in the memory for code block ID; and a third function for storing the program counter value in the program counter, and continuing the process from the instruction next to that at the occurrence of the interrupt.

[10] In a compiler for generating object codes of a program to be executed in the computer according to either one of the above [6] to [9], included are: a first processing for dividing the program to be compiled into a plurality of code blocks at least taking the portion where a control flow control branches, and the portion where a plurality of execution control flows join together as borders, and allotting the expected value of code block ID to each code block; and a second processing for inserting an instruction code to update the value of code block ID just before the instruction to shift the control flow between different code blocks, and inserting an instruction code for checking the integrity on whether the value of code block ID is identical with the expected value or not, and when the value of code block ID is not identical with the expected value, inserting an instruction code for judging that there is an error with the control flow control in respective code blocks.

According to the above means, an expected value of code block ID is allotted to each code block, and an instruction code to update the value of code block ID is inserted just before the instruction to shift the control flow between different code blocks, and the integrity on whether the value of code block ID is identical with the expected value or not is checked. When the value of code block ID is not identical with the expected value, an instruction code for judging that there is an error with the control flow control is inserted into respective code blocks. This achieves the provision of a compiler for generating object codes of a program to be executed in a computer for precisely carrying out an inspection on whether the program has been transited in the correct sequence or not.

The effects obtained by typical aspects of the present invention will be briefly described below.

Specifically, according to the present invention, it is possible to provide a technique for precisely carrying out an inspection on whether the program has been transited in the correct sequence or not. Further, according to the present invention, it is possible to provide a computer for precisely carrying out an inspection on whether the program has been transited in the correct sequence or not. Furthermore, according to the present invention, it is possible to provide a complier for generating object codes of a program to be executed in a computer for precisely carrying out an inspection on whether the program has been transited in the correct sequence or not.

BRIEF DESCRIPTIONS OF THE DRAWINGS

DESCRIPTIONS OF THE PREFERRED EMBODIMENTS

Figure 7:
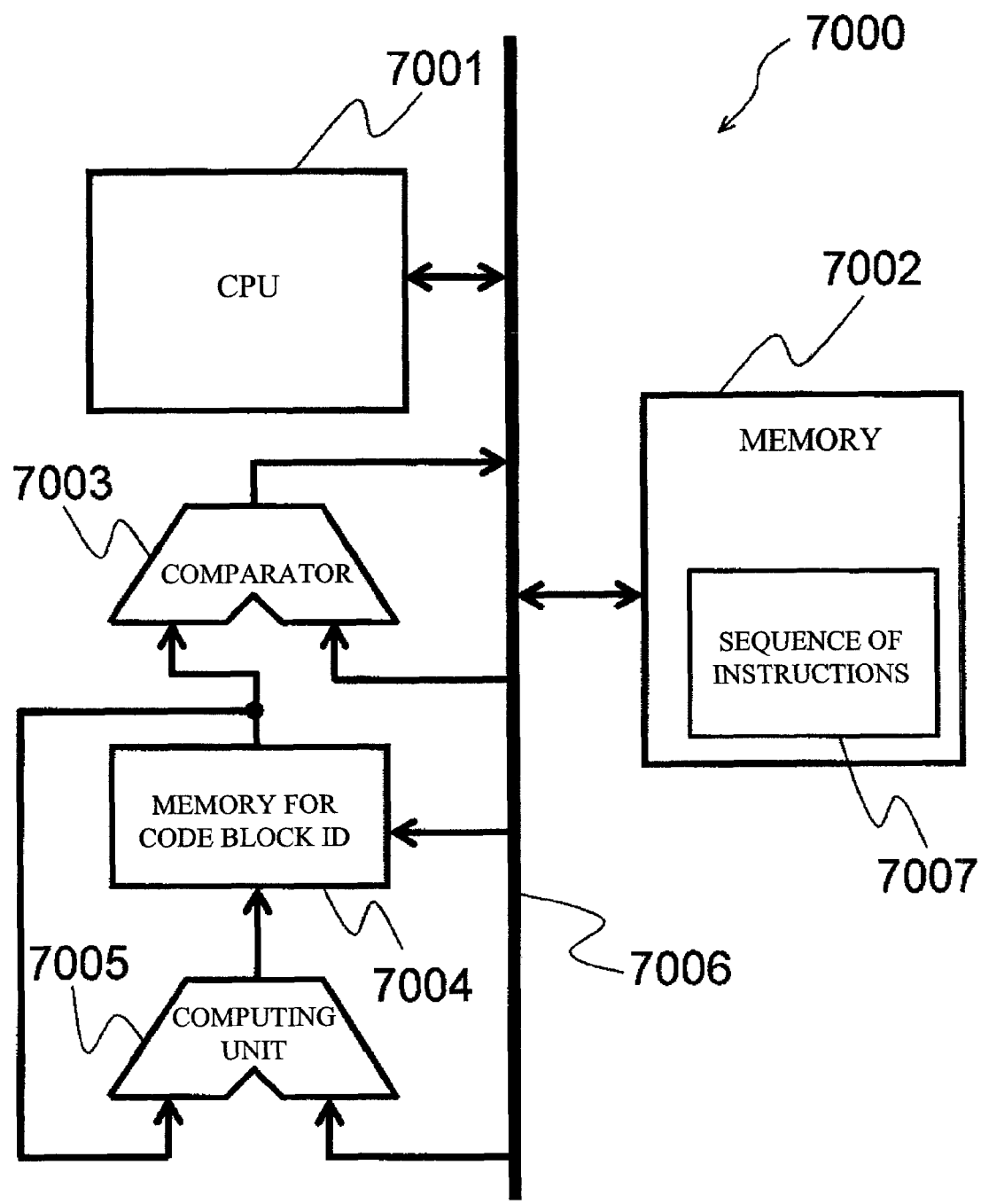
FIG. 7 is a block diagram showing a configuration example of a microcomputer as an example of a computer according to the present invention.

In FIG. 7, a microcomputer as an example of a computer according to the present invention is shown. This microcomputer 7000 is to be used for carrying out a method for detecting control flow error according to the present invention, and though it is not limited specifically, it is formed on a semiconductor substrate such as a single crystal silicon substrate or the like, by known manufacturing technologies of semiconductor integrated circuit.

The microcomputer 7000 shown in FIG. 7 includes: a computer (CPU) 7001 such as a central processing unit or the like that interprets and executes an instruction fetched via a bus 7006; a memory 7002 that can store the stream of instructions to be executed by the CPU 7001; a memory for code block ID 7004 that can store code block IDs; a comparator 7003 that can compare the output data of the memory for code block ID 7004 and the data fetched via the bus 7006; and a computing unit 7005 that can perform a operation processing of the output data of the memory for code block ID 7004 and the data fetched via the data bus 7006. The output data of the computing unit 7005 is transmitted to the memory for code block ID 7004, and, the output data of the comparator 7003 is supplied to the CPU 7001 via the bus 7006. The comparison result in the comparator 7003 is taken as a control flow error detection result, and in the CPU 7001, on the basis of the control flow error detection result, necessary measures such as suspending of instruction interpretation processing, interrupt and the like are made.

Next, the control flow error detection in the microcomputer 7000 of the above configuration is explained in details.

Figure 2:
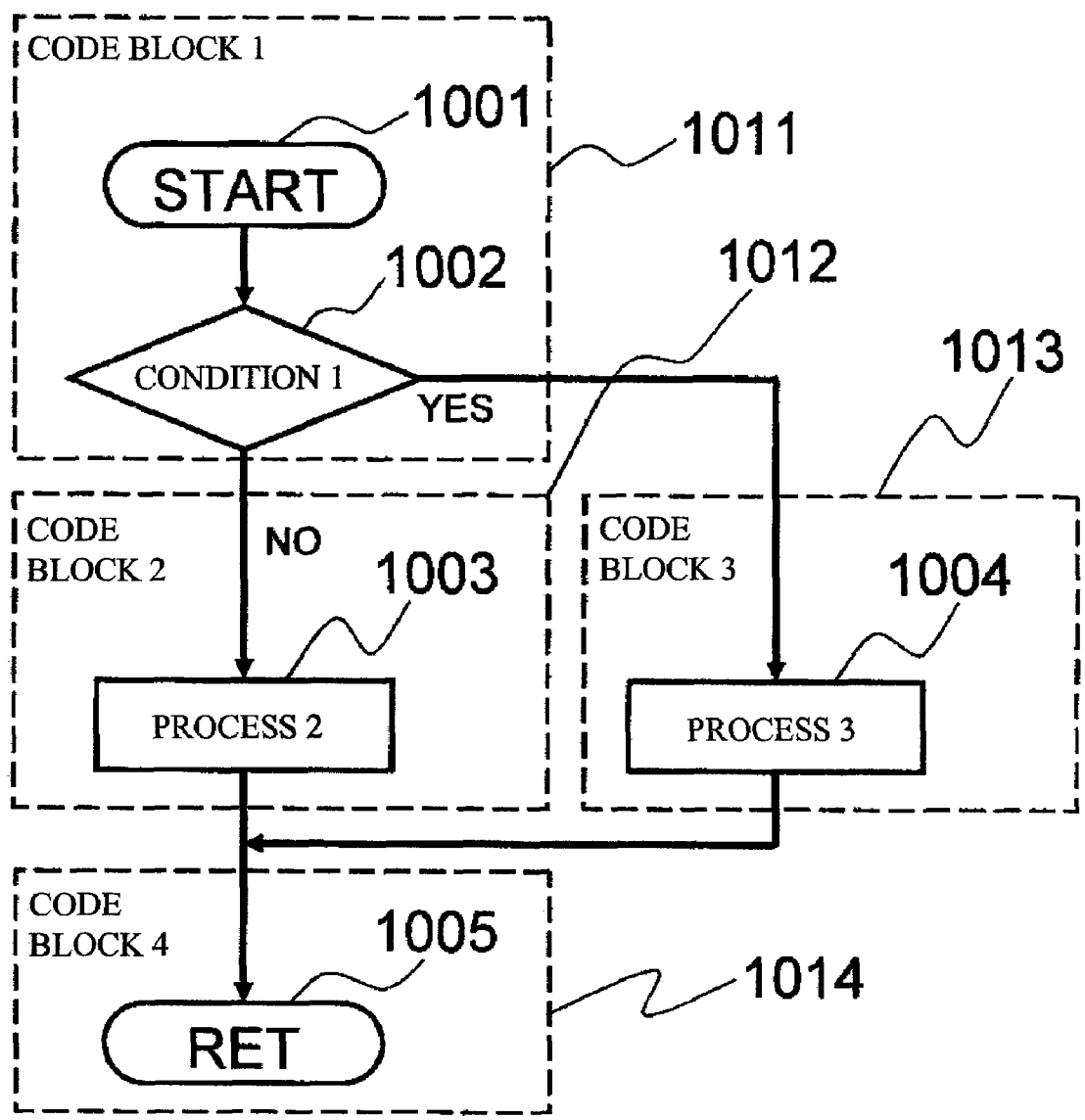
FIG. 2 is a flow chart for explaining a division of code blocks in the method for detecting a control flow error.

In FIG. 2, the basic configuration example of a program to be executed in the microcomputer 7000 of the above configuration.

As shown in FIG. 2, the program to be executed in the microcomputer 7000 of the above configuration divided beforehand under specified conditions has a plurality of code blocks 1 to 4. The above code blocks 1 to 4 are units into which a program is divided with at least at a portion where the control flow branches and a portion where the control flows join together taken as borders. In the example shown in FIG. 2, at least the portion where the control flow branches under a condition 1 (1002), and the portion where the process 2 (1003) and the process 3 (1004) join together are borders of the code blocks. Further, an entrance of a subroutine is a point where plural portions call and the control flows join together. Accordingly, the entrance of the subroutine is the border of code blocks. In the same manner, when the process of subroutine is completed, and returns to the program at the calling side, the entrance is the point to return to different calling sources, therefore it is also a border of code block.

Figure 1:
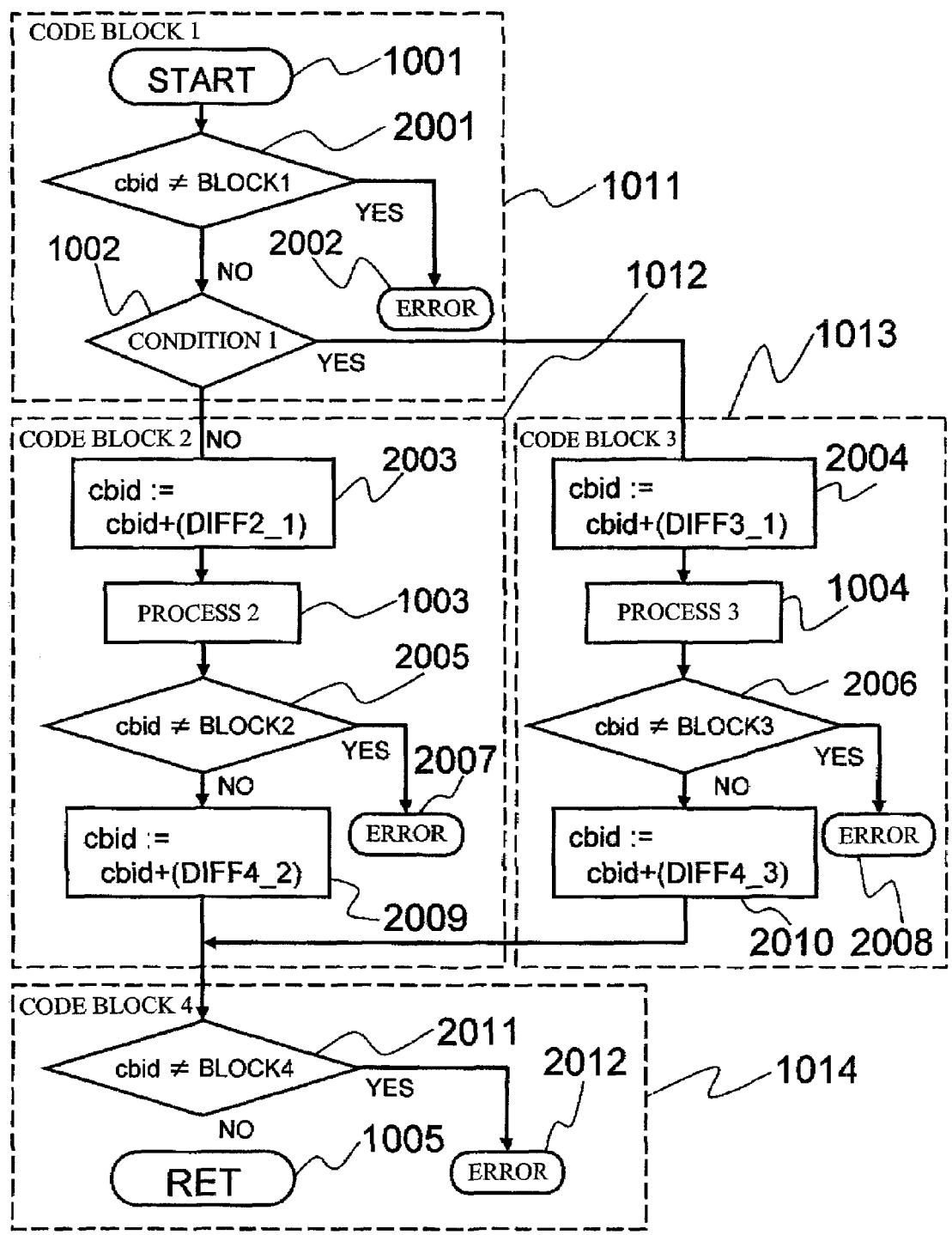
FIG. 1 is a flow chart showing an example of a method for detecting a control flow error according to the present invention.

In FIG. 1, the flow of the method of detecting control flow error is shown. As explained already with reference to FIG. 2, the program is divided into a plurality of code blocks, and code block IDs are allotted to respective code blocks. Further, "cbid" in FIG. 1 indicates a variable for accessing the memory for code block ID 7004, and "BLOCK 1, BLOCK 2, BLOCK 3 " are each an expected value of the code block ID allotted beforehand to the code block, and also a constant. "DIFFi_j" is the differential value of code block in the case of a transition from code block j to code block i, and the relation with the expected value of the code block ID is expressed by the following equation.

DIFF$i\_j$=BLOCK$i$-BLOCK$j$

In other words, a new code block ID can be obtained by adding the differential value in the computing unit 7005. Herein, the differential value is an example of the code block operation value in the present invention. Further, in the present example, when the program shown in FIG. 1 is executed, cbid is initialized by the expected value BLOCK1 of the code block ID corresponding to the code block 1 (1011). The execution of the program is started from START (1001), and first it is judged whether the value stored in the memory for code block ID 7004 is identical to the expected value or not (2001). This judgment is made by the comparator 7003. Then, in the case when the value is different from the expected value in the judgment at the step 2001 (YES), it is judged that calling is not made in the regular procedure, and it is judged as an error (2002). In this case, in the CPU 7001, necessary measures such as suspending of the instruction interpretation processing, and the like are made. Further, in the case where it is judged that the value is not different from the expected value (NO) in the judgment at the step 2001, it is judged whether the condition 1 is established or not (1002). This judgment may be also made by the comparator 7003. In this judgment, in the case when it is judged that the condition 1 is established (YES), the procedure is transited to the code block 3 (1013). Further, in the judgment at the step 1002, in the case when it is judged that the condition 1 is not established (NO), the procedure is transited to the code block 2 (1012). When the transition to the code block 2 is made, first in the computing unit 7005, the differential value DIFF2_1 is added to cbid, and the value stored in the memory for code block ID 7004 is made so as to be equal to the expected value of the code block 2 (2003). Subsequently, the process 2 (1003) as the primary process is carried out in the CPU 7001, thereafter, it is checked whether the value stored in the memory for code block ID 7004 is identical to the expected value BLOCK2 or not (2005). This judgment is made by the comparator 7003. In the comparison at the step 2005, in the case where the value stored in the memory for code block ID 7004 is not identical to the expected value BLOCK3 (YES), it is judged as an error, and in the CPU 7001, necessary measures such as suspending of the instruction interpretation processing, interrupt and the like are made. In the case of a transition from other place than the code block 1 to the code block 2 is made for some reason, the value stored in the memory for code block ID 7004 is supposed to be other than BLOCK1, and in this case, since the value of the code block ID calculated in the updating process (2003) is not identical to BLOCK2, it is judged as an error. Further, in the case where the value stored in the memory for code block ID 7004 is identical to BLOCK1 albeit transition is made from other place than the code block 1 to the code block 2, by the same check carried out in the code block before the transition, it is judged as an error.

Before transiting to the code block 4, a process (2009) to add DIFF4_2 to cbid and update it so that the value to be stored in cbid becomes identical to BLOCK4 is carried out, and the procedure is transited to the code block 4 (1014).

In the same manner, also in the code block 3 (1013), updating (2004) of the value of the memory for code block ID 7004, a primary process 3 (1004), checking (2006) of the value stored in the memory for code block ID are carried out. In the case where integrity is lost, it is judged as an error (2008), and in the CPU 7001, necessary measures such as suspending of the instruction interpretation processing, interrupt and the like are made.

Further, before transition to the code block 4 (1014), a process (2010) to add DIFF4_3 to cbid so that the value of cbid becomes identical to BLOCK4 is carried out, and the procedure is transited to the code block 4 (1014). Just after the transaction to the code block 4 (1014), checking (2011) of integrity of the value of cbid is carried out by the comparator 7003, and in the case when the value of cbid is different from BLOCK4, it is judged as an error (2012).

The updating of cbid in the memory for code block ID 7004 is carried out by use of the differential value in this manner, therefore, even in the case where execution control flows join together, it is possible to easily confirm integrity by once of inspection.

Further, in the transition from the code block 2 (1012) to the code block 4 (1014), the checking (2005) of integrity of cbid in the code block 2 (1012) can be passed only when cbid is BLOCK2, and further the updating process of cbid is adding (2009) of the differential value, accordingly, what can pass the integrity check (2011) of cbid of the code block 4 (1014) is only the case where cbid changes from BLOCK2 to BLOCK4. In the same manner, the transition from the code block 3 (1013) to the code block 4 (1014) becomes correct only in the case where cbid can pass the integrity check (2011) of cbid of the code block 4 (1014), that is, only the case where cbid changes from BLOCK3 to BLOCK4. Accordingly, also in the case where control flows joint together, in the code block at the interflow destination, it is not necessary to carry out the individual check per interflow source.

According to the above example, the following operation effects can be obtained.

(1) The updating of cbid in the memory for code block ID 7004 is carried out by use of the differential value in this manner, therefore, even in the case where execution control flows join together, it is possible to easily confirm integrity by once of inspection.

(2) In concrete, with regard to a program having complicated control flows including branches and interflows of control flows, the code block ID value of the code block now under execution is stored in the memory for code block ID 7004, and at every transition of execution control among code blocks, by use of the differential value between the code block ID at the transition destination and the code block ID at the transition source, the ID value stored in the memory for code block ID 7004 is updated. Therefore, in the case when a transition is not carried out in the correct sequence, the value stored in the memory for code block ID 7004 is not identical to the expected value of the code block ID of the code block that is executed actually, and accordingly, when the code block ID stored in the memory for code block ID 7004 is inspected, an error is detected by the comparator 7003. At the moment of updating of the code block ID value stored in the memory for code block ID 7004, the code block ID of the code block at the transition destination is not substituted, but updating is made by use of the differential value between the code block at the transition source and that at the transition destination, therefore, if either the differential value or the ID value stored in the memory for code block ID 7004, or both thereof are erroneous, it does not become identical with the code block ID of the code block at the transition destination. Once the value of the code block ID stored into the memory for code block ID becomes a wrong value, it does not become a correct value in later updating process of the code block ID either, therefore, even if in the case when the process to check the value of the code block ID overlooks an error for some reason, for example due to external disturbance, the error is detected in the inspection of the code block ID to be carried out later. And in the case where the error occurs, in the CPU 7001, necessary measures against attacks such as suspending of the instruction interpretation processing, interrupt and the like are made.

(3) By the operation effect of the above (2), it is possible to provide the highly reliable microcomputer 7000.

Figure 3:
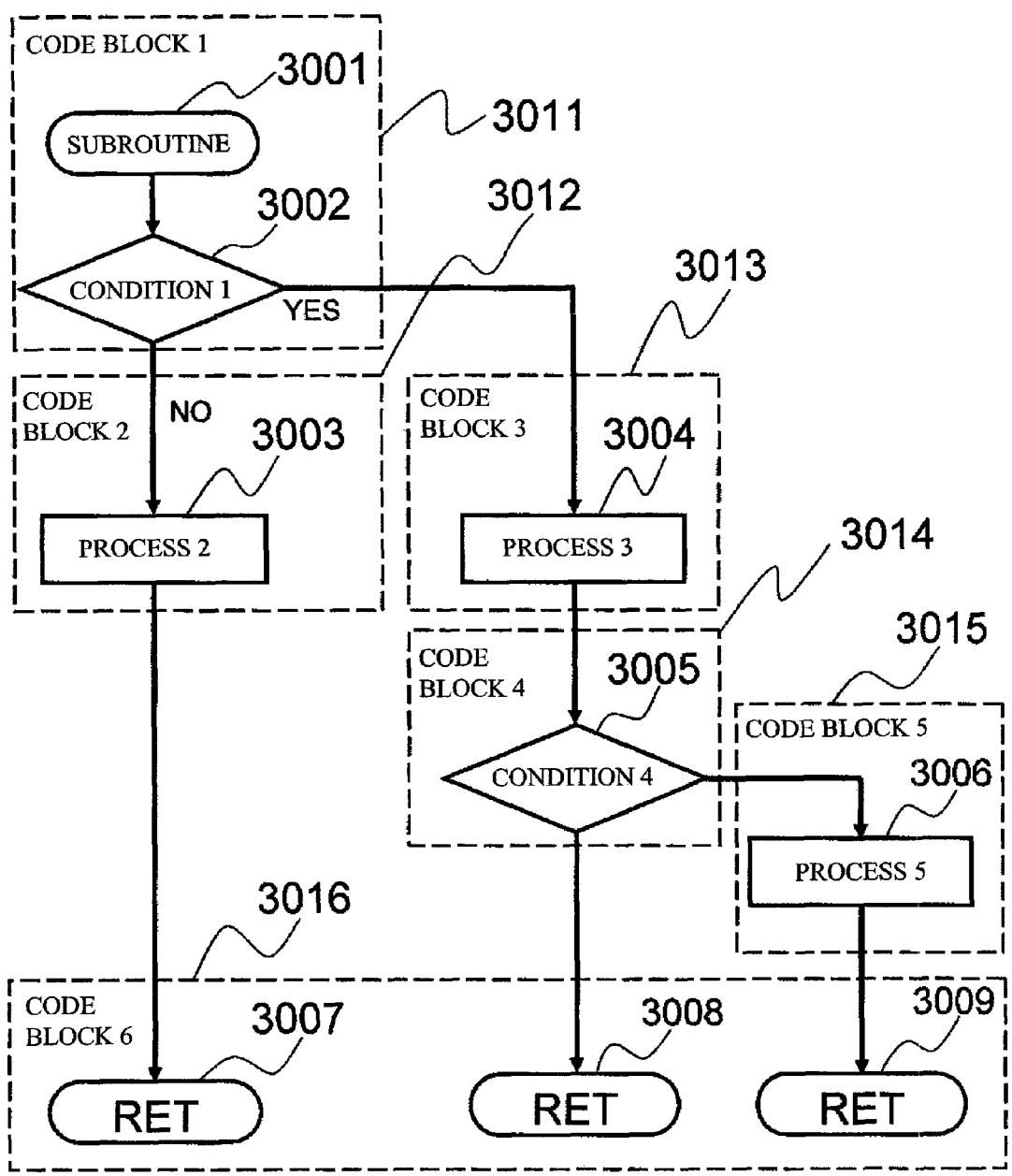
FIG. 3 is a flow chart showing another example of a method for detecting a control flow error according to the present invention.

In FIG. 3, another flow of the method for detecting control flow error is shown.

In the case where a subroutine is included as shown in FIG. 3, the control flow error detection is carried out as described below.

In a code block 1 (3011), it is judged whether the condition 1 is established or not (3002), and in a code block 2 (3012), a process 2 (3003) is carried out, and in a code block 3 (3013), a process 3 (3004) is carried out, and in a code block 4 (3014), it is judged whether the condition 4 is established or not (3005). In a code block 5 (3015), a process 5 (3006) is carried out.

Figure 4:
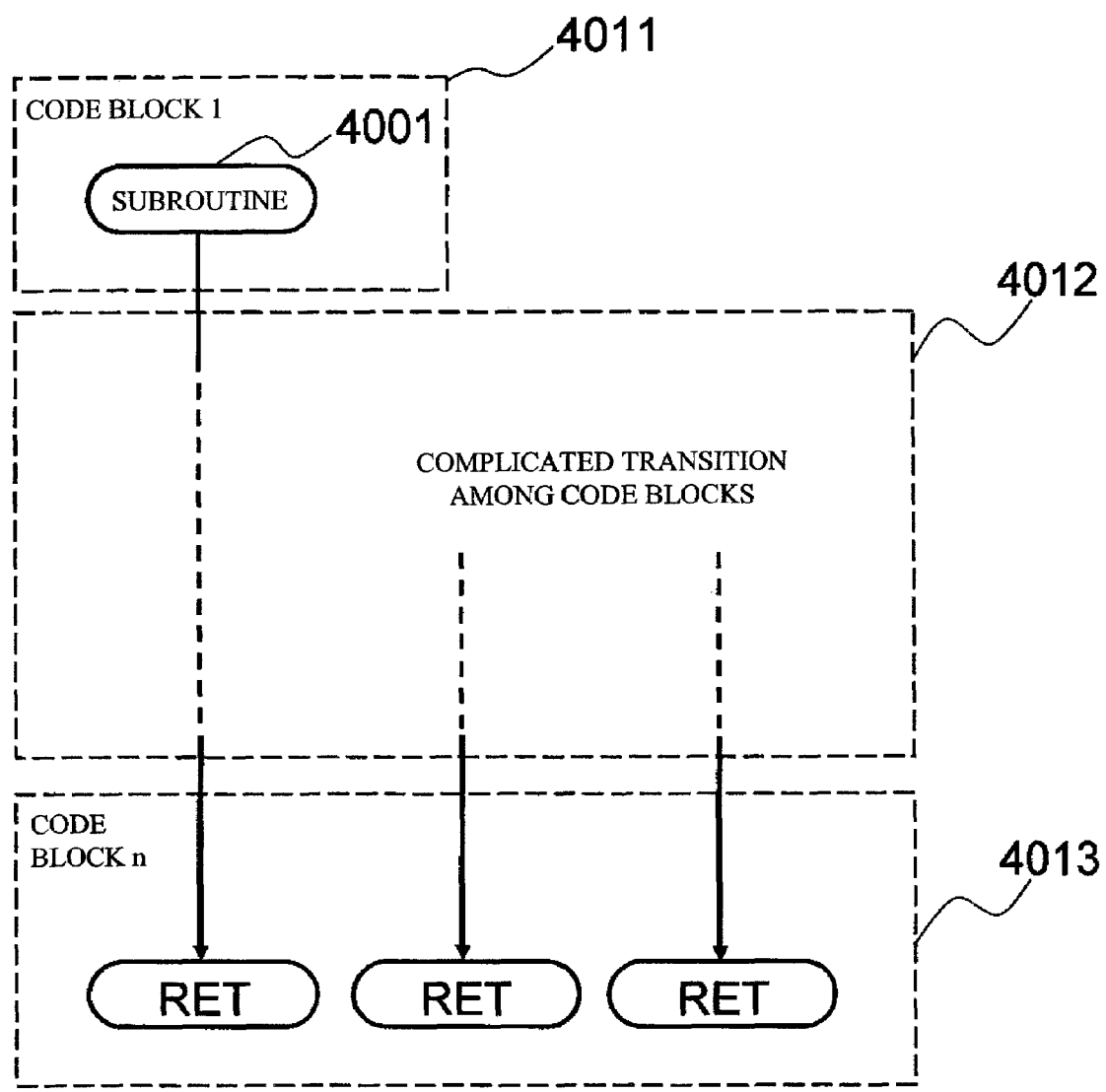
FIG. 4 is a flow chart showing another example of a method for detecting a control flow error according to the present invention.

In the subroutine, there exist return instructions (3007, 3008, 3009) to surely return the control to the call source, and the code block 6 (3016) of the block where these plural return instructions exist is handled as a same block. Therefore, as shown in FIG. 4, when only information of two code blocks of the head code block (4011) and the block (4013) where the return instruction exists is already known from the outside, regardless of a transition among code blocks 4012 existing or not, it is possible to perform the updating of the code block ID and the error check at the moment to call the subroutine.

Figure 5:
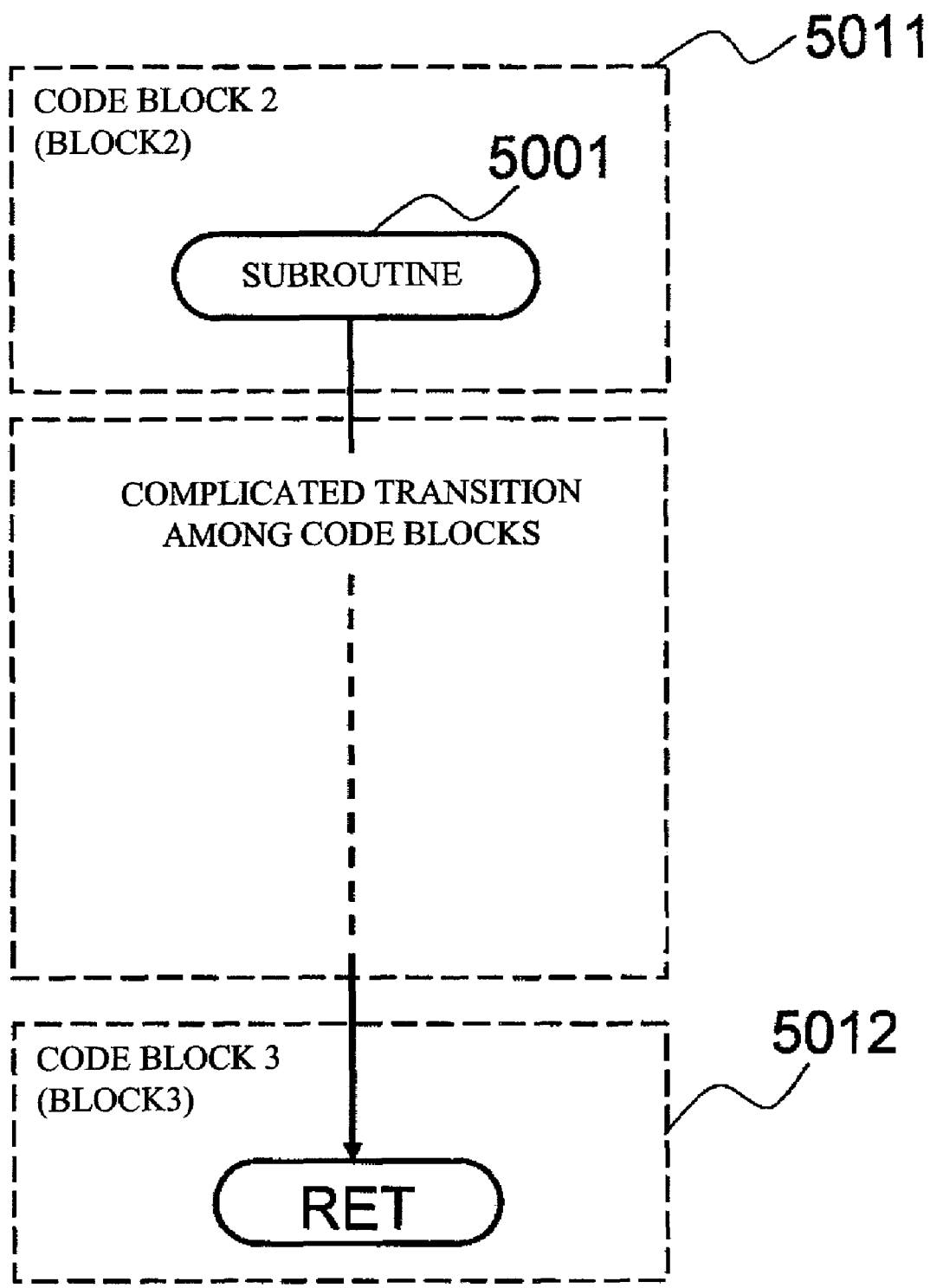
FIG. 5 is a flow chart showing another example of a method for detecting a control flow error according to the present invention

In FIG. 5, the division of the subroutine to the code block viewed from the outside and an allotment example of the code block ID are shown.

To the head block (5011) of the subroutine, BLOCK2 is allotted as the code block, and the code block ID of the code block 3 (5012) including all the return instructions is BLOCK3.

Figure 6:
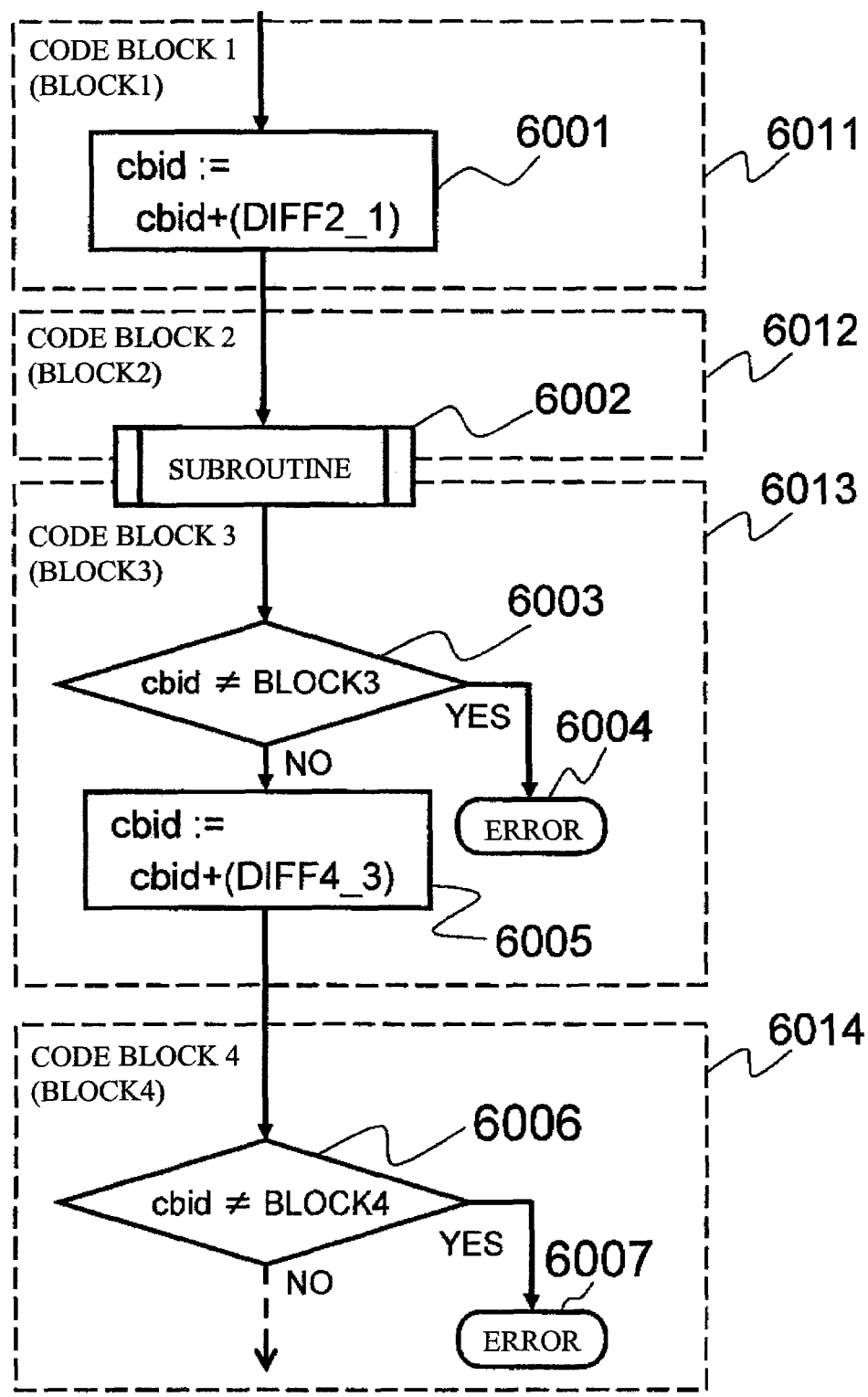
FIG. 6 is a flow chart showing another example of a method for detecting a control flow error according to the present invention.

In FIG. 6, a process flow of the program at the calling side to call the subroutine is shown.

Now suppose that BLOCK1 is allotted to the code block ID of the code block 1 (6011) just before calling the subroutine shown in FIG. 5, and BLOCK4 is allotted to the code block 4 (6014) after calling the subroutine as the code block ID. The code blocks 2, 3 are code blocks that are determined depending on the subroutine. Herein, cbid indicates a variable for accessing the memory for code block ID, "DIFFi_j" is the differential value of code block in the case of a transition from code block j to code block i, and the relation with the expected value of the code block ID is expressed by the following equation.

$$\text{DIFF}i\_j = \text{BLOCK}i - \text{BLOCK}j$$

While the code block 1 (6011) in FIG. 6 is executed correctly, the value of cbid becomes BLOCK1. Before calling the subroutine, in the computing unit 7000, a process (6001) to add DIFF2_1 to cbid is carried out so that the value of cbid becomes identical to the code block ID of the code block at the head of the subroutine, then the subroutine is called out (6002). In the case when the subroutine is executed in the correct execution route, the value of cbid becomes identical to BLOCK3 that is the code block ID of the code block (5012) where the return instruction from the subroutine exists, and accordingly, in the comparator 7003, it is checked whether the value of cbid is identical to BLOCK3 (6003), and if it is not identical, it is judged as an error (6004).

Figure 8:
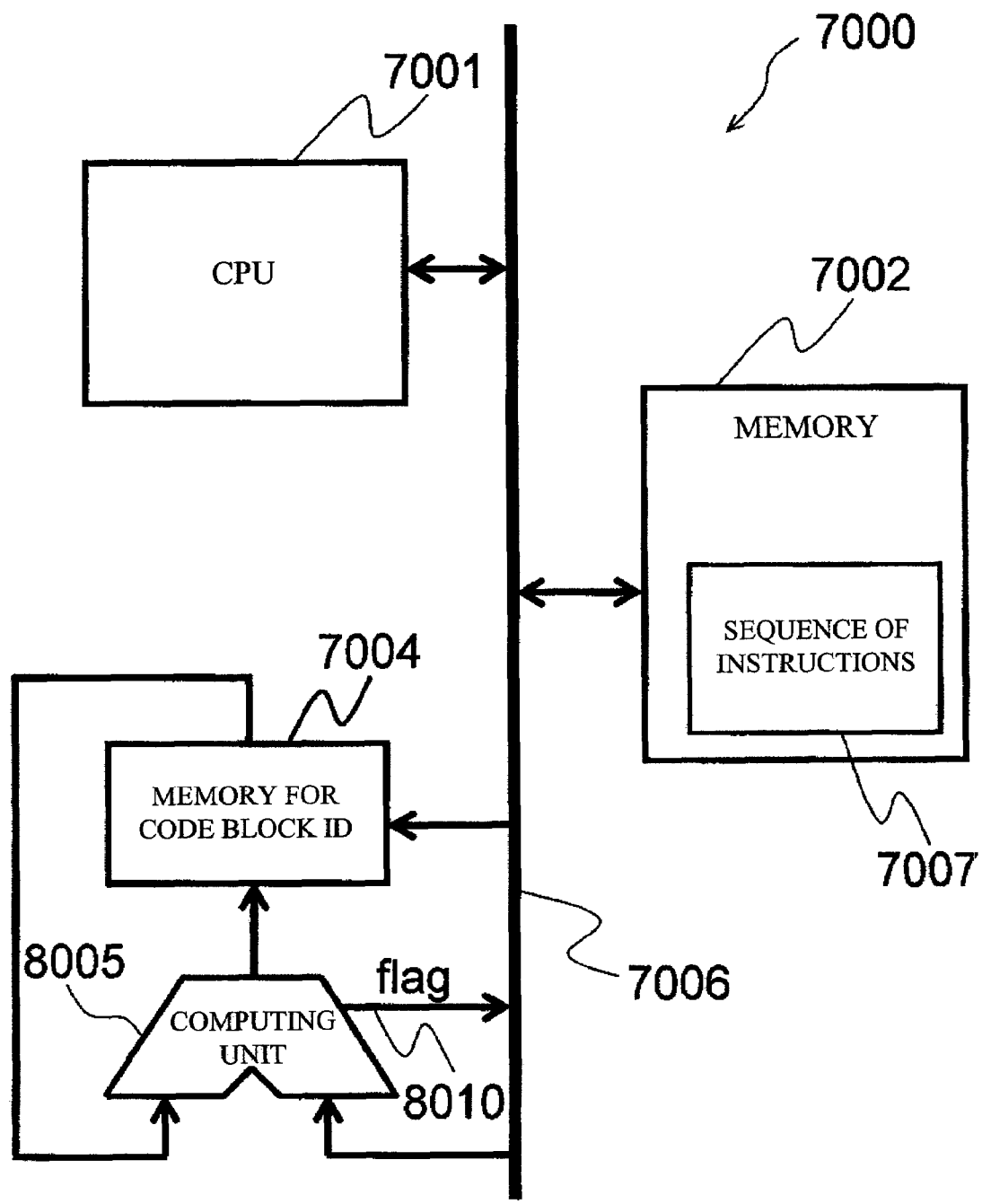
FIG. 8 is a block diagram showing another configuration example of a microcomputer as an example of a computer according to the present invention.

In FIG. 8, another configuration example of the microcomputer 7000 as an example of a computer according to the present invention is shown.

The microcomputer 7000 shown in FIG. 8 is greatly different from one shown in FIG. 7 in that a computing unit 8005 for updating the value of the memory for code block ID 7004 has a function to output the comparison result as a flag 8010 so as to be used as comparison means for checking the integrity between the value stored in the memory for code block ID 7004, and the expected value of the code block ID now under execution.

A sequence of instructions 7007 to become the detection objective of the control flow error is stored in a memory 7002, and the sequence of instructions is divided into, for example, a plurality of code blocks as shown in FIG. 1, and includes sequences of instructions for value update (2003, 2009, 2010) and for carrying out inspection (2001, 2005, 2006, 2011) of the memory for code block ID 7004. The sequence of instructions 7007 stored in the memory 7002 goes through a bus 7006, and is sent to a CPU 7001, and initializes the value of the memory for code block ID 7004 via the bus 7006. When the value of the memory for code block ID 7004 is updated along with the transition between code blocks, the differential value is transmitted from the CPU 7001 to the computing unit 8005 via the bus 7006, and the computing unit 8005 computes a new code block ID by use of the transmitted differential value and the value stored in the memory for code block ID 7004, and stores the computational result into the memory for code block ID 7004.

The computing unit 8005, in addition to the updating of the value stored in the memory for code block ID 7004, compares the value of the memory for code block ID 7004 and the expected value of the code block ID sent via the bus 7006 from the CPU 7001, and outputs the result of whether they are identical or not as a flag 8010. The CPU 7001, in accordance with the output result of the flag 8010 by the computing unit 8005, continues the execution interpretation process in the case where the expected value and the actual ID value are identical, and takes necessary measures such as suspending of the instruction interpretation processing, interrupt and the like in the case where the expected value and the value stored in the memory for code block ID 7004 are different.

Figure 9:
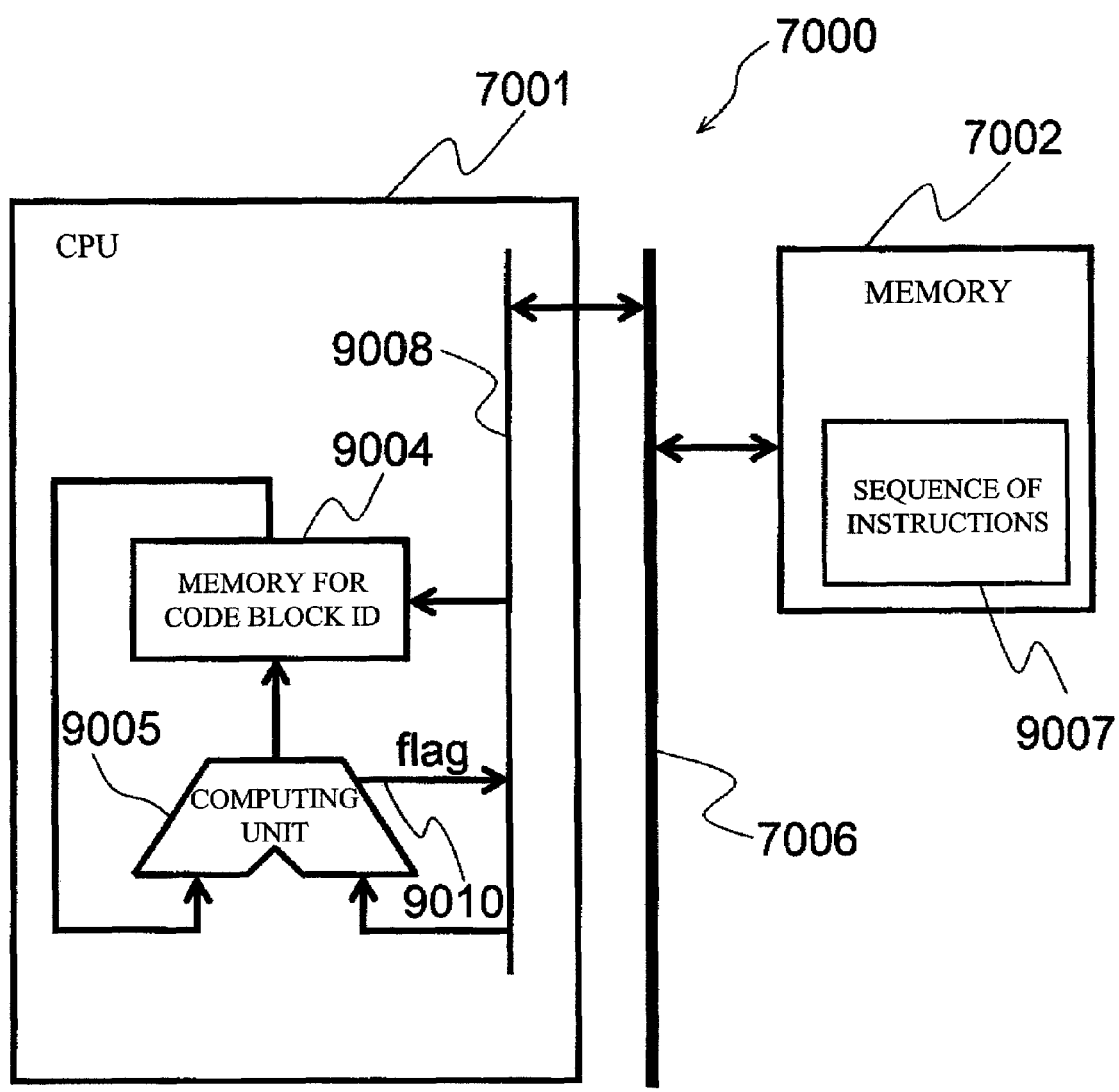
FIG. 9 is a block diagram showing another configuration example of a microcomputer as an example of a computer according to the present invention.

In FIG. 9, still another configuration example of the microcomputer 7000 as an example of a computer according to the present invention is shown.

A microcomputer 7000 shown in FIG. 9 is greatly different from one shown in FIG. 8 in that a memory for code block ID 9004 is packaged in a CPU 7001, and a computing unit 9005 for updating the value of the memory for code block ID 9004 is packed in the CPU 7001. In this case, the memory for code block ID 9004 may be constructed by a general-purpose register and the like. Further, the computing unit 9005 may be designed also to be used as a general-purpose computing unit used in other normal computation processes than the computation of the value of code block ID. Further, this computing unit 9005 has a function to output the comparison result as a flag 9010 so as to be used for checking the integrity between the value stored in the memory for code block ID 9004 and the expected value of the code block ID now under execution.

A sequence of instructions 9007 to become the detection objective of the control flow error is stored in a memory 7002, and the sequence of instructions is divided into, for example, a plurality of code blocks as shown in FIG. 1, and includes sequences of instructions for value update (2003, 2009, 2010) and for carrying out an inspection (2001, 2005, 2006, 2011) of the memory for code block ID 9004. The sequence of instructions stored in the memory 7002 goes through a bus 7006, and is sent to a CPU 7001, and initializes the value of the memory for code block ID 9004 via the bus 7006. When the value of the memory for code block ID is updated along the transition between code blocks, the differential value stored expressively in the sequence of instructions 9007 in the memory 7002 is transmitted to the computing unit 9005 via an internal bus 9008, and the computing unit 9005 computes a new code block ID by use of the transmitted differential value and the value stored in the memory for code block ID 9004, and stores the code block ID again in the memory for code block ID 9004.

The computing unit 9005, in addition to the updating of the value stored in the memory for code block ID 9004, compares the value of the memory for code block ID 9004 and the expected value of the code block ID expressively stored in the sequence of instructions 9007 in the memory 7002, and outputs the result of whether they are identical or not as a flag 9010. The CPU 7001, in accordance with the output result of the flag 9010 by the computing unit 9005, continues the execution interpretation process in the case where the expected value and the actual ID value are identical, and takes necessary measures such as suspending of the instruction interpretation processing, interrupt and the like in the case where the expected value and the value stored in the actual memory for code block ID are different.

Figure 10:
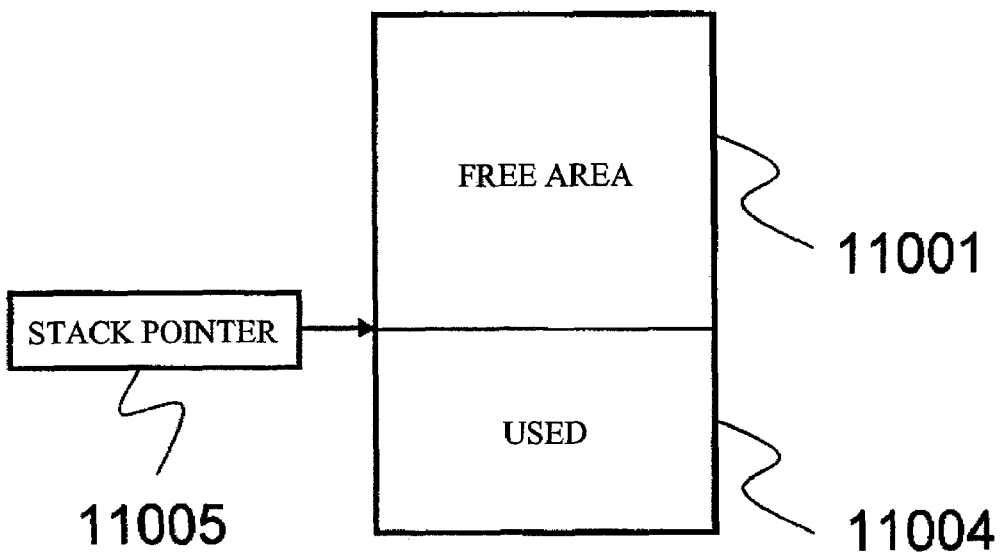
FIG. 10 is an explanatory diagram of a status of use of a stack at occurrence of an interrupt in the microcomputer.
Figure 11:
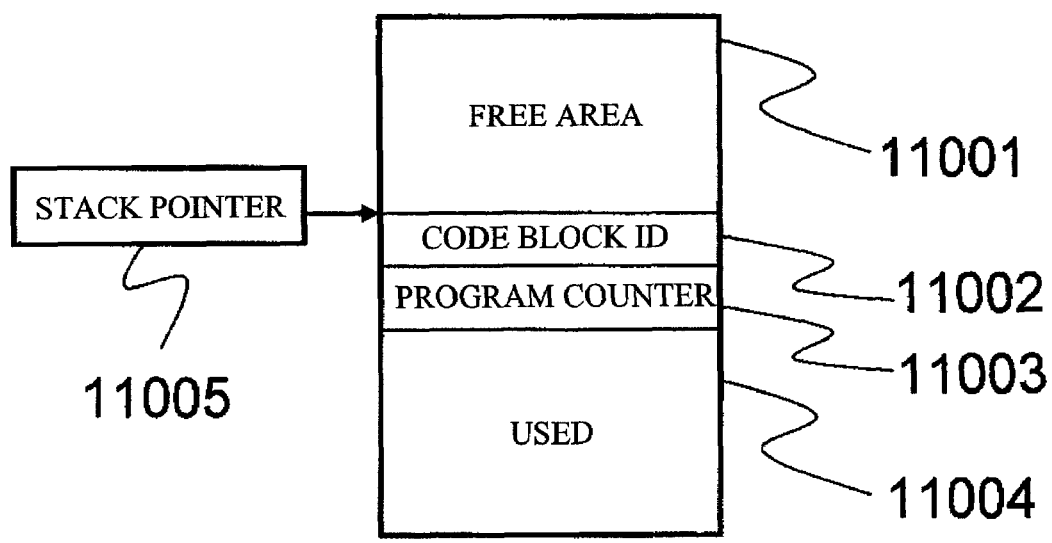
FIG. 11 is another explanatory diagram of a status of use of the stack at occurrence of an interrupt in the microcomputer.

In FIG. 10 and FIG. 11, condition of use of stack at occurrence of an interrupt in the above microcomputer 7000 is shown.

In FIG. 10, the address of the head of a used area 11004 is shown by a stack pointer 11005. The address lower than the address which is indicated by the stack pointer 11005 is a free area 11001. At occurrence of an interrupt, the value of program counter and the code block ID value stored in the memory for code block ID are stored in the address indicated by the stack pointer 11005. The value of the stack pointer 11005 is changed for only the area used for storing the program counter value and the code block value. The condition where the program counter value and the code block value are stored in the memory is shown in FIG. 11. In the case of recovery from the interrupt process, the code block ID 11002 and the program counter 11003 are fetched from the address that is indicated by the stack pointer 11005, and the code block ID is stored in the memory for code block ID, and the program counter is stored in the program counter, and the process is continued from the next instruction at the moment of occurrence of the interrupt.

Next, a compiler for generating object codes to be executed in the above microcomputer 7000 is explained.

Figure 12:
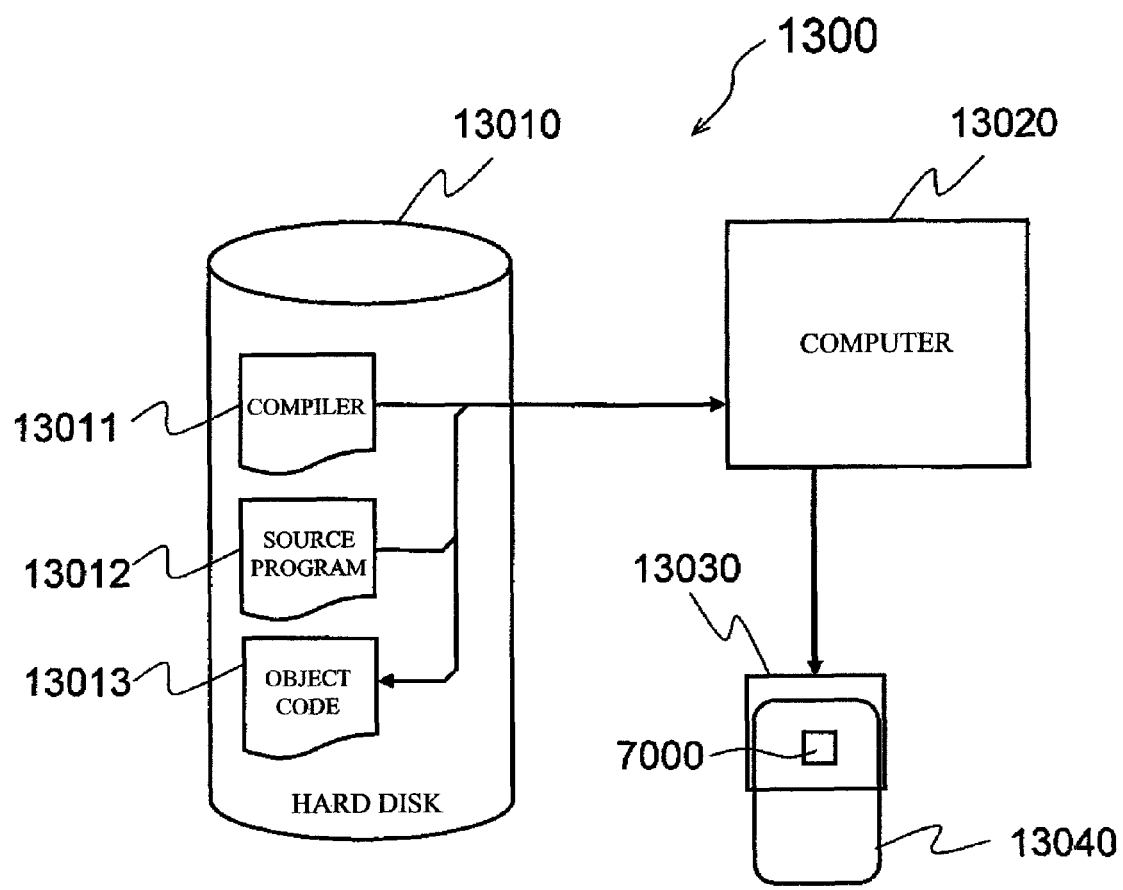
FIG. 12 is a block diagram showing a configuration example of a computer system on which a compiler is operated.

In FIG. 12, a computer system 1300 on which the compiler is operated is shown.

The computer system shown in FIG. 12 includes a hard disk 13010, a computer 13020, and a reader writer 13030. In the hard disk 13010, a compiler 13011 and a source program 13012 are stored. The compiler 13011 is read into the computer 13020 and executed, the source program 13012 is compiled. By this compiling, an object code 13013 (executable program) having tamper resistance is generated from the source program, and stored in the hard disk 13010. And this object code 13013 is written in the memory 7002 (refer to FIG. 7 to FIG. 9) in the microcomputer 7000, as a program to be executed by the microcomputer 7000 built in, for example, a card 13040. The memory 7002 is not limited specifically, but it is a flash memory, where onboard writing by the reader writer 13030 is available.

Figure 13:
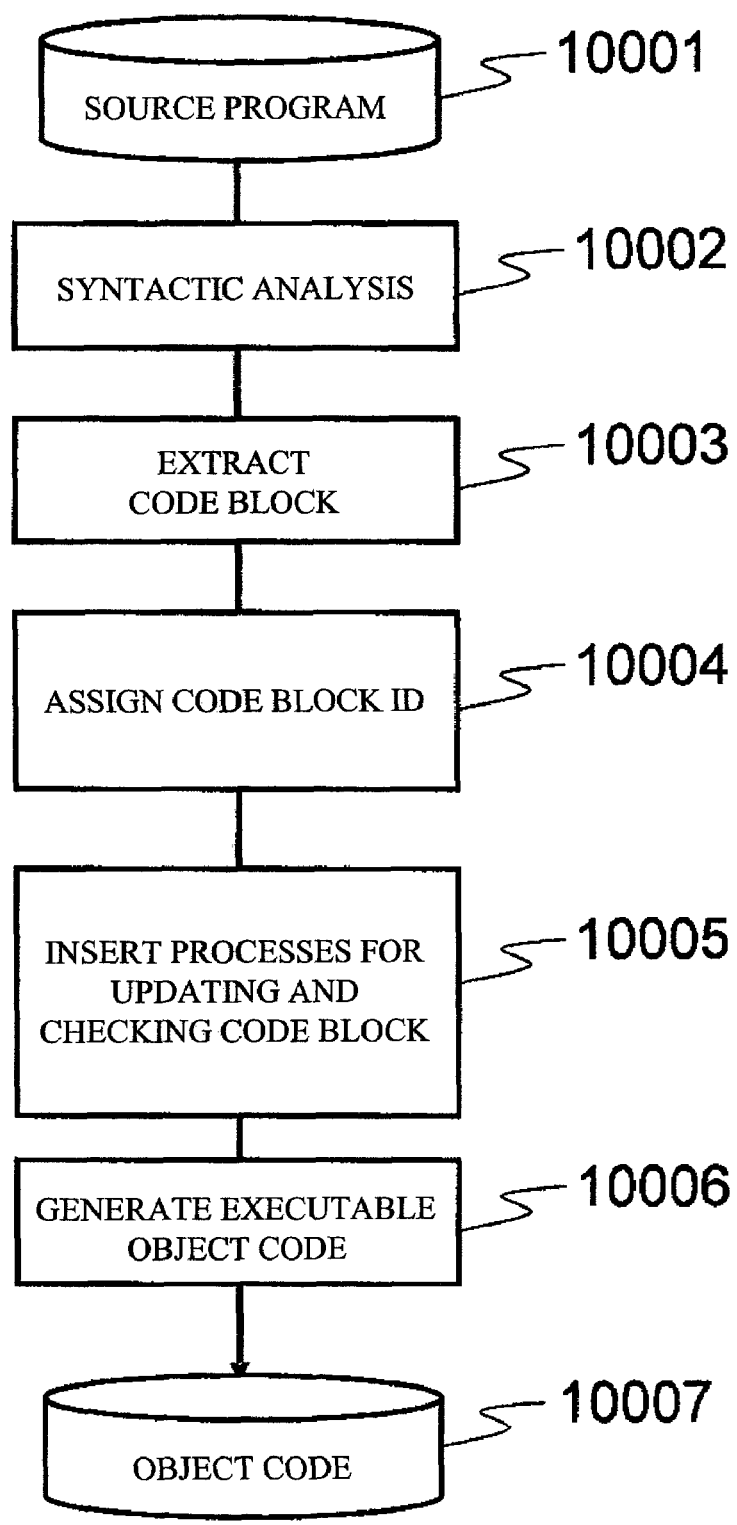
FIG. 13 is a flow chart showing a process by the compiler.

In FIG. 13, a process flow of the compiler 13011 is shown.

A source program (10001) is syntax analyzed by a normal syntactic analysis (10002), and divided into code blocks by an extract code block (10003), with branches, interflows of control flow as borders at least. When code blocks are extracted, in addition to branches, interflows of control flow, code blocks may be divided into further smaller units. To the divided code blocks, by an assign code block ID (10004), allotment of expected value of code block ID is carried out respectively. It is preferable that the expected value of code block ID becomes a unique value in difference code block, however, there may be duplication in expected values of code block ID. For example, the code block ID may be allotted by a method that is expected to have a low possibility of duplication, by use of, for example, ordinary hash function or the like. Finally, by an insert processes for updating and checking code block (10005), adding of codes so as to make the updating process of code block ID and the integrity check process appear in the executable program. At this moment, the updating process of code block ID must be added to all the transitions between different code blocks, but the integrity check process of code block ID may not appear in all the code blocks. By a process to generate executable object code (10006) by ordinary method, an object code (10007) having means of fault detection by code block ID is generated.

In the foregoing, the invention made by the inventors of the present invention has been concretely described. However, it is needless to say that the present invention is not limited to the description and various modifications and alterations can be made within the scope of the present invention.

For example, the updating process of block ID in FIG. 1 may be carried out by modular multiplication in modulo a prime number P. In the case where the value of code block ID transits from block A to block B, the value of C shown in the following equation is modular multiplied, and thereby the code block ID can be updated from A to B.

$$B = C \cdot A \bmod P$$

In this case, if it stands that 0<A<P and 0<B<P, the value of C always exists. The value of C is also 0<C<P, and can be calculated by the following equation.

$$C = B \cdot A^{-1} \bmod P$$

In this case, $A^{-1}$ mod P is an inverse element of A modulo P, and if P is a prime number and it stands that 0<A<P, the inverse element always exists. Since B is 0<B<P, the values of B and $A^{-1}$ exist as 0<C<P. Further, $A^{-1}$ mod P can be calculated efficiently by use of Extended Euclidean algorithm.

A calculation example is shown below.

For example, now suppose A=12345, B=7987, P=65537, then the calculation is as shown below.

$$A^{-1} \bmod P = 12345^{-1} \bmod 65537 = 31651$$

Accordingly, the value of C becomes as the following.

$$C = B \cdot A^{-1} \bmod P = 20328$$

Thus, the product of modular multiplication with the prime number P as modulo is taken as the code block operation value, and the product of modular multiplication with the value stored in the memory for code block ID device and the prime number P of the differential value as modulo is calculated, and the value of code block ID is updated, and thereby the same operation effect as the above example may be obtained.

In the explanations made heretofore, the invention made by the present inventors has been explained with the case applied to a microcomputer as the field of the invention, however, the present invention is not limited to this, but the present invention may be applied widely to various computers.

What is claimed is:

1. A method for detecting control flow error in a computer that executes a program, the method comprising:
    dividing the program into a plurality of code blocks;
    allocating a unique code block ID to each code block of the plurality of code blocks, the code block IDs being different from program counters;
    storing in a memory, at a moment when execution of the program is started, the code block ID corresponding to an execution start address;
    as execution control of the program being executed transits from one code block as a transition source code block to another code block as a transition destination code block, updating the code block ID stored in the memory by use of a code block operation value obtained beforehand for the transition source code block and the transition destination code block, the code block operation value being obtained beforehand based on a value of the code block ID allocated to the transition destination code block and a value of the code block ID allocated to the transition source code block; and
    judging whether the updated code block ID stored in the memory and the code block ID allocated to the transition destination code block are identical or not,
    wherein a control flow error is detected if the updated code block ID and the code block ID allocated to the transition destination code block are not identical.

2. The method for detecting control flow error according to claim 1,
    wherein a head of a subroutine in the program and a portion where the subroutine returns to a calling source of the program belong to respectively different code blocks, and
    wherein, if there are a plurality of return instructions to return to the calling source in the same subroutine, the plurality of return instructions are included in the same code block.

3. The method for detecting control flow error according to claim 2,
    wherein, before execution of instruction for subroutine call of the subroutine, by use of a differential value calculated beforehand so as to render a code block ID before the subroutine call identical with a code block ID of a head of the subroutine, the code block ID value stored in the memory is updated, and
    after the execution of the instruction for subroutine call of the subroutine, by use of a differential value between a code block ID value corresponding to where the return instruction of the subroutine is located and a code block ID corresponding to after the execution of the instruction for subroutine call of the subroutine, the code block ID value stored in the memory is updated.

4. The method for detecting control flow error according to claim 1,
    wherein the code block operation value is obtained beforehand by subtracting the value of the code block ID allocated to the transition destination code block from the value of the code block ID allocated to the transition source code block; and
    wherein updating the code block ID stored in the memory comprises subtracting the code block operation value from the code block ID value in the memory.

5. The method for detecting control flow error according to claim 1,
    wherein the code block operation value is obtained beforehand by a product of modular multiplication in modulo a prime number P obtained by the value of the code block ID allocated to the transition destination code block and an inverse modulo of the value of the code block ID allocated to the transition source code block, and
    wherein updating the code block ID stored in the memory comprises calculating a product of modular multiplication in modulo a prime number P of the value of the code block ID stored in the memory and the code block operation value.

6. The method for detecting control flow error according to claim 1, further comprising:
    at an occurrence of an interrupt of the execution of the program, storing a value of a program counter and a value of the code block ID which is stored in the memory in an address indicated by a stack pointer, and changing a value of the stack pointer for only an area used for storing the value of the program counter and the value of the code block ID;

in a case of recovery from the interrupt, fetching the value of the program counter and the value of the code block ID from the address indicated by the stack pointer, and storing the value of the code block ID in the memory; and storing the value of the program counter, which is fetched from the address indicated by the stack pointer, in the program counter, and resuming the execution of the program from an instruction which is next following the occurrence of the interrupt.

7. The method for detecting control flow error according to claim 1, further comprising:

dividing the program to be compiled into the plurality of code blocks taking at least a portion where a control flow control branches into multiple execution control flows and another portion where a plurality of execution control flows join together as borders for the code blocks, and to allocating an expected value of code block ID to each code block of the plurality of code blocks; and inserting an instruction code to update the value of code block ID just before an instruction to shift execution control flow between different code blocks, and inserting an instruction code for checking integrity on whether the value of the updated code block ID is identical to the expected value of the code block ID or not, wherein there is an error with the control flow control when the value of the updated code block ID is not identical to the expected value of the code block ID for any of the respective code blocks.

8. A computer for executing a program that is divided into a plurality of code blocks, and, a unique code block ID being allocated to each code block of the plurality of code blocks, the computer comprising:

a memory to store a code block ID corresponding to an execution start address at a moment when execution of the program is started;

a computing unit to update the code block ID stored in the memory, as execution control of the program being executed transits from one code block as a transition source code block to another code block as a transition destination code, block, by use of a code block operation value obtained beforehand for the transition source code block and the transition destination code block, the code block operation value being obtained before based on a value of the code block ID allocated to the transition destination code block and a value of the code block ID allocated to the transition source code block; and a comparator that judges whether the updated code block ID stored in the memory and the code block ID allocated to the transition destination code block are identical or not, wherein a control flow error is detected if the updated code block ID and the code block ID allocated to the transition destination code block are not identical.

9. The computer according to claim 8, wherein the computing unit includes the comparator.

10. The computer according to claim 9, further comprising:
a CPU that interprets and executes instructions,
wherein the CPU includes the memory and the computing unit.

11. The computer according to claim 8, further comprising a CPU that interprets and executes instructions, the CPU being configured:

at an occurrence of an interrupt of the execution of the program, to store a value of a program counter and a value of the code block ID which is stored in the memory in an address indicated by a stack pointer, and to change a value of the stack pointer for only an area used for storing the value of the program counter and the value of the code block ID;

in a case of recovery from the interrupt, to fetch the value of the program counter and the value of the code block ID from the address indicated by the stack pointer, and to store the value of the code block ID in the memory; and to store the value of the program counter, which is fetched from the address indicated by the stack pointer, in the program counter, and to resume the execution of the program from an instruction which is next following the occurrence of the interrupt.

12. The computer according to claim 8, wherein a head of a subroutine in the program and a portion where the subroutine returns to a calling source of the program belong to respectively different code blocks, and wherein, if there are a plurality of return instructions to return to the calling source in the same subroutine, the plurality of return instructions are included in the same code block.

13. The computer according to claim 12, wherein, before execution of instruction for subroutine call of the subroutine, by use of a differential value calculated beforehand so as to render a code block ID before the subroutine call identical with a code block ID of a head of the subroutine, the computing unit updates the code block ID value stored in the memory, and after the execution of the instruction for subroutine call of the subroutine, by use of a differential value between a code block ID value corresponding to where the return instruction of the subroutine is located and a code block ID corresponding to after the execution of the instruction for subroutine call of the subroutine, the computing unit updates the code block ID value stored in the memory.

14. The computer according to claim 8, wherein the code block operation value is obtained beforehand by subtracting the value of the code block ID allocated to the transition destination code block from the value of the code block ID allocated to the transition source code block; and wherein updating the code block ID stored in the memory comprises subtracting the code block operation value from the code block ID value in the memory.

15. The computer according to claim 8, wherein the code block operation value is obtained beforehand by a product of modular multiplication in modulo a prime number P obtained by the value of the code block ID allocated to the transition destination code block and an inverse modulo of the value of the code block ID allocated to the transition source code block, and wherein updating the code block ID stored in the memory comprises calculating a product of modular multiplication in modulo a prime number P of the value of the code block ID stored in the memory and the code block operation value.

16. The computer according to claim 8, further comprising a compiler for generating object codes of the program to be executed, the compiler being configured:

to divide the program to be compiled into the plurality of code blocks taking at least a portion where a control flow control branches into multiple execution control flows and another portion where a plurality of execution control flows join together as borders for the code blocks, and to allocate an expected value of code block ID to each code block of the plurality of code blocks; and to insert an instruction code to update the value of code block ID just before an instruction to shift execution control flow between different code blocks, and to insert an instruction code for checking integrity on whether the value of the updated code block ID is identical to the expected value of the code block ID or not, wherein there is an error with the control flow control when the value of the updated code block ID is not identical to the expected value of the code block ID for any of the respective code blocks.

17. A computer for executing a program that is divided into a plurality of code blocks, and, a unique code block ID being allocated to each code block of the plurality of code blocks, the computer comprising:

a memory to store a code block ID corresponding to an execution start address at a moment when execution of the program is started; and a computing unit to update the code block ID stored in the memory, as execution control of the program being executed transits from one code block as a transition source code block to another code block as a transition destination code, block, by use of a code block operation value obtained beforehand for the transition source code block and the transition destination code block, the code block operation value being obtained before based on a value of the code block ID allocated to the transition destination code block and a value of the code block ID allocated to the transition source code block, wherein the computing unit further judges whether the updated code block ID stored in the memory and the code block ID allocated to the transition destination code block are identical or not, wherein a control flow error is detected if the updated code block ID and the code block ID allocated to the transition destination code block are not identical.

18. The computer according to claim 17, further comprising:

a CPU that interprets and executes instructions, wherein the CPU includes the memory and the computing unit.

19. The computer according to claim 17, further comprising a CPU that interprets and executes instructions, the CPU being configured:

at an occurrence of an interrupt of the execution of the program, to store a value of a program counter and a value of the code block ID which is stored in the memory in an address indicated by a stack pointer, and to change a value of the stack pointer for only an area used for storing the value of the program counter and the value of the code block ID;

in a case of recovery from the interrupt, to fetch the value of the program counter and the value of the code block ID from the address indicated by the stack pointer, and to store the value of the code block ID in the memory; and to store the value of the program counter, which is fetched from the address indicated by the stack pointer, in the program counter, and to resume the execution of the program from an instruction which is next following the occurrence of the interrupt.

20. The computer according to claim 17, further comprising a compiler for generating object codes of the program to be executed, the compiler being configured:

to divide the program to be compiled into the plurality of code blocks taking at least a portion where a control flow control branches into multiple execution control flows and another portion where a plurality of execution control flows join together as borders for the code blocks, and to allocate an expected value of code block ID to each code block of the plurality of code blocks; and to insert an instruction code to update the value of code block ID just before an instruction to shift execution control flow between different code blocks, and to insert an instruction code for checking integrity on whether the value of the updated code block ID is identical to the expected value of the code block ID or not, wherein there is an error with the control flow control when the value of the updated code block ID is not identical to the expected value of the code block ID for any of the respective code blocks.

* * * * *